United States Patent [19]
Shelby

[11] Patent Number: 5,503,356
[45] Date of Patent: Apr. 2, 1996

[54] FOLDING TARGET STAND

[76] Inventor: Jeff Shelby, 4208 Scottsdale, Eugene, Oreg. 97404

[21] Appl. No.: 368,549

[22] Filed: Jan. 3, 1995

[51] Int. Cl.[6] .................................................. F16M 11/38
[52] U.S. Cl. ............................ 248/170; 40/610; 248/166
[58] Field of Search ................. 248/452, 163.1, 248/431, 166, 168, 169, 170, 440, 463, 464, 451, 453, 455, 432, 434, 188.7, 351; 40/606, 607, 610

[56] References Cited

U.S. PATENT DOCUMENTS

| | | | |
|---|---|---|---|
| 602,517 | 4/1898 | McFadden . | |
| 760,260 | 5/1904 | Schultz | 248/434 X |
| 782,932 | 2/1905 | Uhl | 248/188.7 |
| 846,348 | 3/1907 | Rockwell | 248/188.7 |
| 2,090,783 | 8/1937 | Chinn | 40/610 |
| 2,646,956 | 7/1953 | Cadwell | 248/170 |
| 3,200,786 | 8/1965 | Swezy et al. | 40/610 X |
| 3,282,530 | 11/1966 | Rash | 242/127 |
| 4,029,318 | 6/1977 | Boss | 248/164 X |
| 4,223,860 | 9/1980 | Prest | 248/171 |
| 4,905,391 | 3/1990 | Dillon | 40/610 |
| 4,923,156 | 5/1990 | Linnéusson | 248/170 |
| 4,988,064 | 1/1991 | Hoshino | 248/168 X |
| 5,145,133 | 9/1992 | France | 248/168 |
| 5,152,485 | 10/1992 | Follick | 248/166 |
| 5,161,768 | 11/1992 | Sarabin | 248/525 |
| 5,209,492 | 5/1993 | Hamilton | 248/463 X |
| 5,363,116 | 11/1994 | Allen | 343/881 |

*Primary Examiner*—J. Franklin Foss
*Attorney, Agent, or Firm*—Robert D. Varitz

[57] ABSTRACT

The stand of the invention includes a vertically disposed elongate column having a leg assembly at one end thereof and, in the preferred embodiment, a target holder at the other, upper end thereof. The leg assembly includes a leg attachment assembly which is located adjacent the lower end of the column and includes multiple leg-receiving pockets therein. The stand includes plural legs, each leg being received in a leg-receiving pocket. The legs are shiftable between a folded position, wherein each leg is aligned substantially parallel to the column, and an extended position, wherein the leg is operable to support the column in an upright position. A spider structure is provided for maintaining the legs in an extended position. The spider structure includes a spider-structure body, which is rotatably received on the column, and spider-structure arms, which are secured to the spider-structure body and which extend outwardly therefrom for contact with the legs when the legs are in their extended position. The target holder is mounted at the upper end of the column and receives a target thereon.

18 Claims, 3 Drawing Sheets

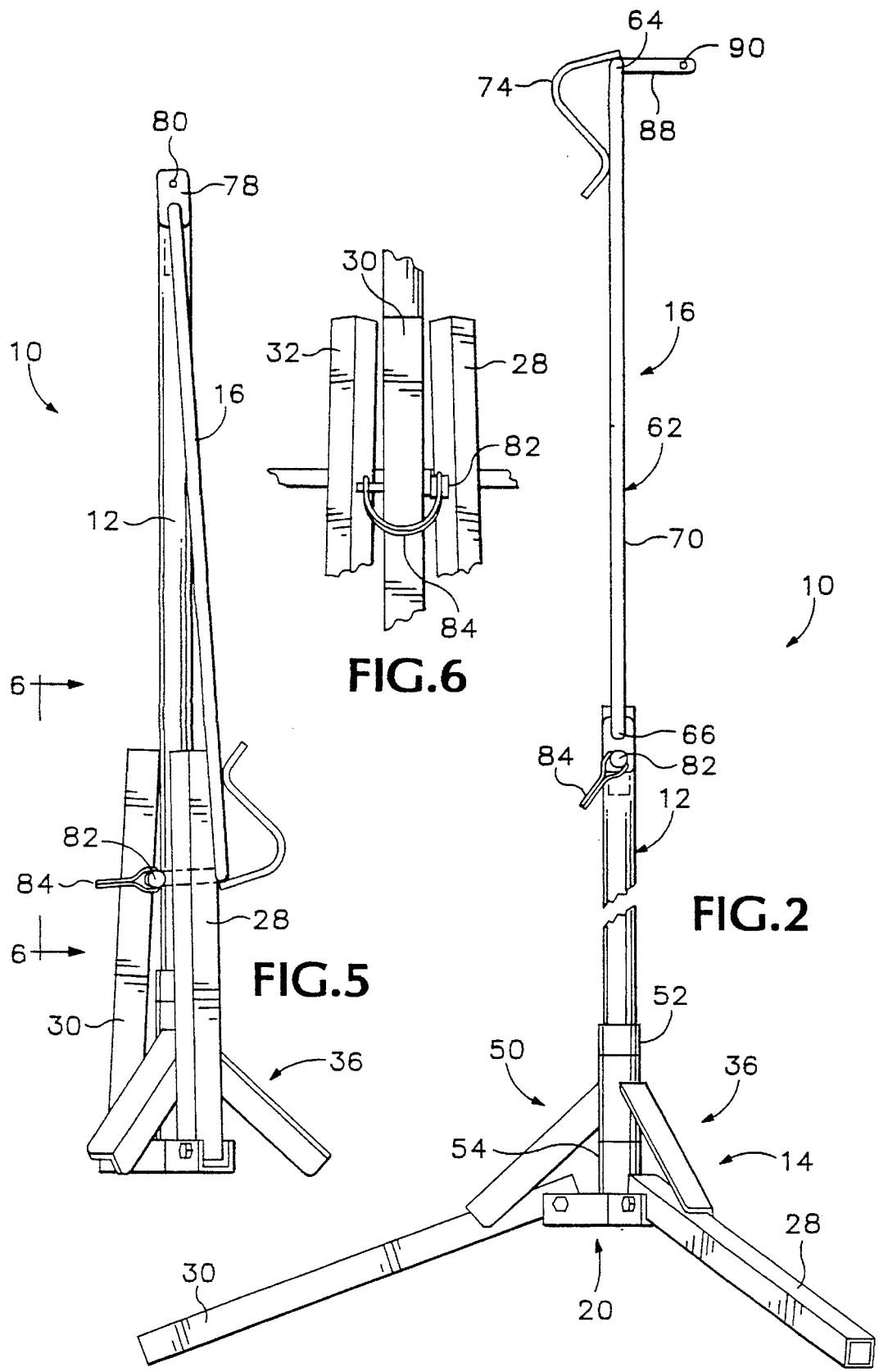

FOLDING TARGET STAND

BACKGROUND OF THE INVENTION

The invention relates to folding stands, and particularly to a folding stand which is constructed to support a target for shooting.

Folding stands are well known. Perhaps the most familiar type of folding stand is the camera tripod, one embodiment of which is depicted in U.S. Pat. No. 2,646,956 to Cadwell et. al. The stand of Cadwell et. al. includes a central column, which supports a camera at the upper end thereof. An arrangement of legs is provided at the lower end of the column, along with provisions for adjusting the legs to provide an upright support on uneven terrain and to allow the legs to fold so that they align substantially parallel to the central axis of the column.

Rash, U.S. Pat. No. 3,282,530, discloses another form of tripod mechanism wherein the legs are attached to a sleeve which travels along a central column and which allows the legs to provide a certain amount of lateral support for the tripod when they are folded along the column, so that the tripod may be left in a standing position.

Linnéusson, U.S. Pat. No. 4,923,156, discloses a stand wherein the legs are attached adjacent the bottom of the column and rotate between a folded position and an extended position. A locking ring is provided to maintain the legs in their extended position.

France, U.S. Pat. No. 5,145,133, discloses a target holder which provides a support and backing for a target which is used for target practice. The legs of the stand are constructed and arranged so that they may be extended to different lengths, to provide level support on uneven terrain.

While the aforementioned devices are all suitable for their intended purposes, they all have certain shortcomings when incorporated into a target stand, particularly wherein the target stand is to be used in connection with high-powered rifles or handguns. One of the problems associated with sands in such use is that the stand may be permanently damaged if it is struck by a projectile from the firearm. Another problem associated with known target stands is that the framework for supporting the target is frequently struck by bullets and, since such frames are usually quite rigid, sustain damage as a result of the impact, or, at a minimum, are caused to fall over.

SUMMARY OF THE INVENTION

The stand of the invention includes a vertically disposed elongate column having a leg assembly at one end thereof and, in the preferred embodiment, a target holder at the other, upper end thereof. The leg assembly includes a leg attachment assembly which is located adjacent the lower end of the column and includes multiple leg-receiving pockets therein. The stand also includes plural legs, each leg being received in a leg-receiving pocket. The legs are shiftable between a folded position, wherein each leg is aligned substantially parallel to the column, and an extended position, wherein the leg is operable to support the column in an upright position. A spider structure is provided for maintaining the legs in an extended position. The spider structure includes a spider-structure body, which is rotatably received on the column, and spider-structure arms, which are secured to the spider-structure body and which extend outwardly therefrom for contact with the legs when the legs are in their extended position. The target holder is mounted at the upper end of the column and receives a target thereon.

It is an object of the invention to provide a stand which may be easily collapsed and expanded.

Another object of the invention is to provide a sand which his suitable for holding a target for use with firearms.

A further object of the invention is to provide a target stand which allows a certain amount of movement between the parts thereof, so that the stand is able to flex when impacted by a projectile.

Still another object of the invention is to provide a stand which is not easily damaged by projectiles.

These and other objects and advantages of the invention will become more readily apparent as the description which follows is read in conjunction with the drawings.

BRIEF DESCRIPTION OF THE DRAWINGS

FIG. 2 is a side elevation of the stand of FIG. 1.

FIG. 5 is a side elevation of a stand in a collapsed position.

FIG. 6 is a partial front elevation of the stand, taken generally along line 6—6 of FIG. 5.

BEST MODE OF PRACTICING THE INVENTION

Figure 1:
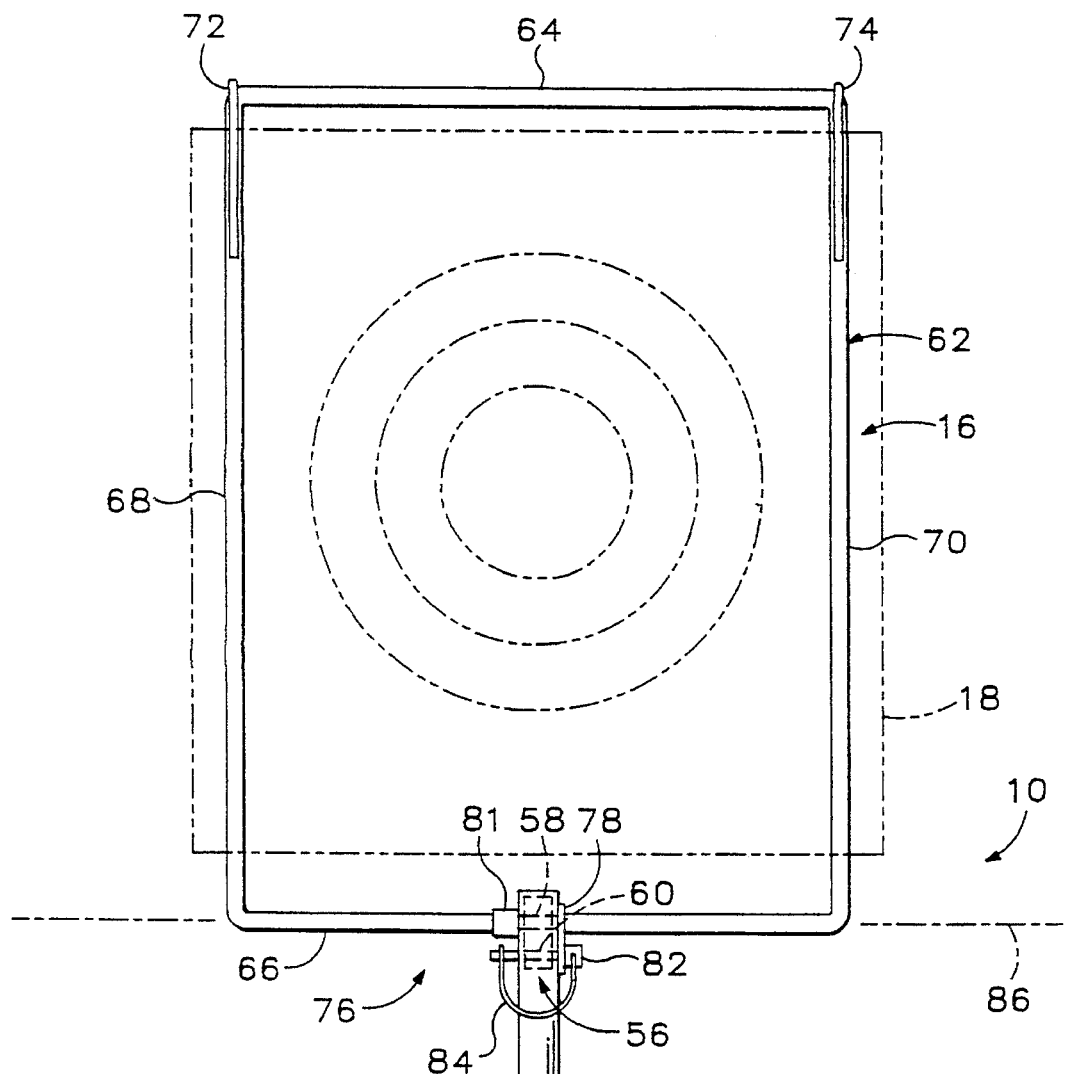
FIG. 1 is front elevation of a stand constructed according to the invention, having a target carried thereon.

Turning now to the drawings, and referring initially to FIGS. 1 and 2, a stand constructed according to the invention is depicted generally at 10. Stand 10 includes a vertically disposed, elongate column 12, a leg assembly 14 and, in the preferred embodiment, a target holder 16. A target 18 is depicted in FIG. 1, and is secured to target holder 16. It should be appreciated that the leg assembly and column of stand 10 are suited for a variety of uses other than holding a target.

Figure 4:
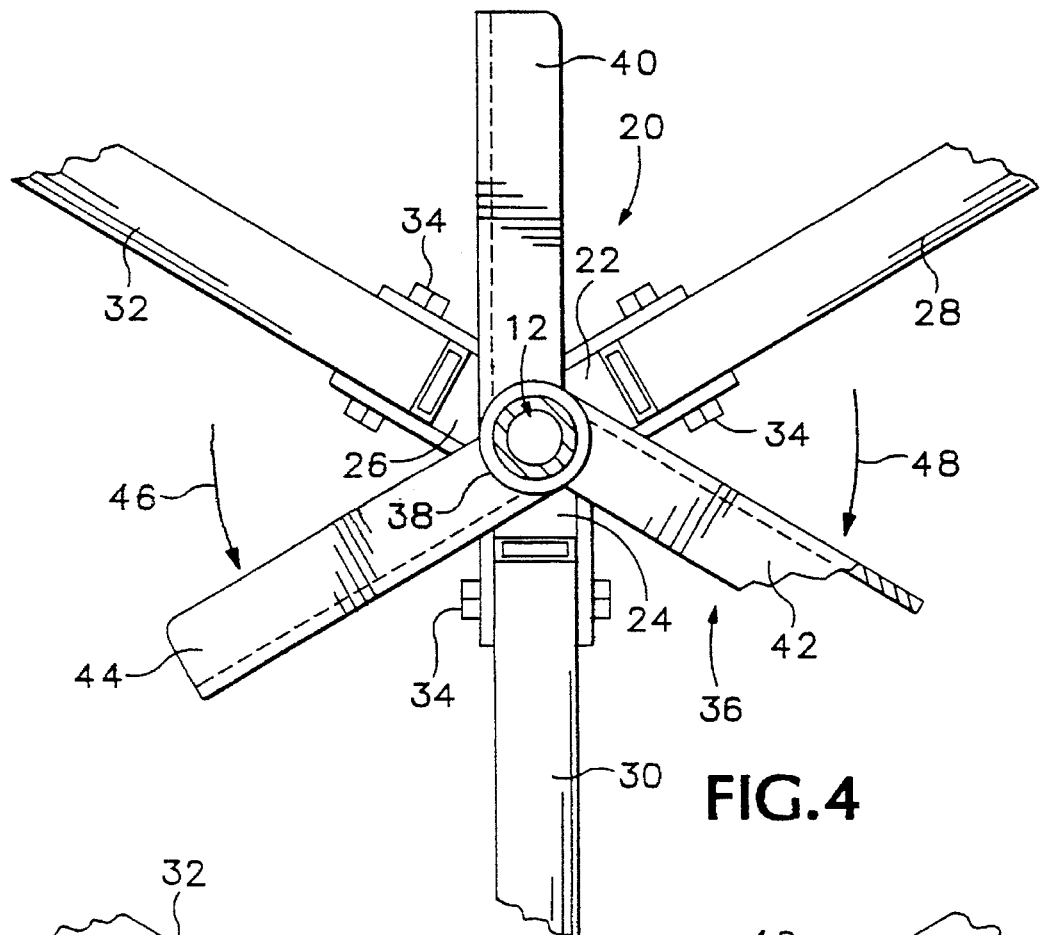
FIG. 4 depicts the spider structure of FIG. 3, with the spider structure being rotated to allow the legs to collapse to a folded position.

Leg assembly 14 includes a leg attachment assembly 20 which is located adjacent the lower end of column 12, and now referring to FIGS. 1, 2 and 4, includes leg-receiving pockets 22, 24 and 26 therein. Leg assembly 14 also includes plural legs, such as those depicted at 28, 30 and 32, which are received in leg-receiving pockets 22, 24 and 26, respectively. The legs are secured into the pockets by means of fasteners, such as nut and bolt combinations 34. If the fastener takes the form of a nut and bolt combination, it is desirable to use a nut with a locking mechanism incorporated therein, such as are found in what are referred to as "aircraft nuts".

Each leg of the leg assembly is rotatable through an arc within the leg-receiving pocket, with the legs being shiftable from a folded position, depicted in FIG. 5, to an extended position, as depicted in FIGS. 1 and 2. In the folded position, each leg is aligned substantially parallel to column 12. The leg is shifted through an arc to the extended position wherein the leg is at least normal to the column, and more likely, to a position such as depicted in FIGS. 1 and 2, wherein the leg swings through an arc of approximately 120 degrees, thereby elevating the base, or lower end, of the column above the surface on which the stand is resting.

Figure 3:
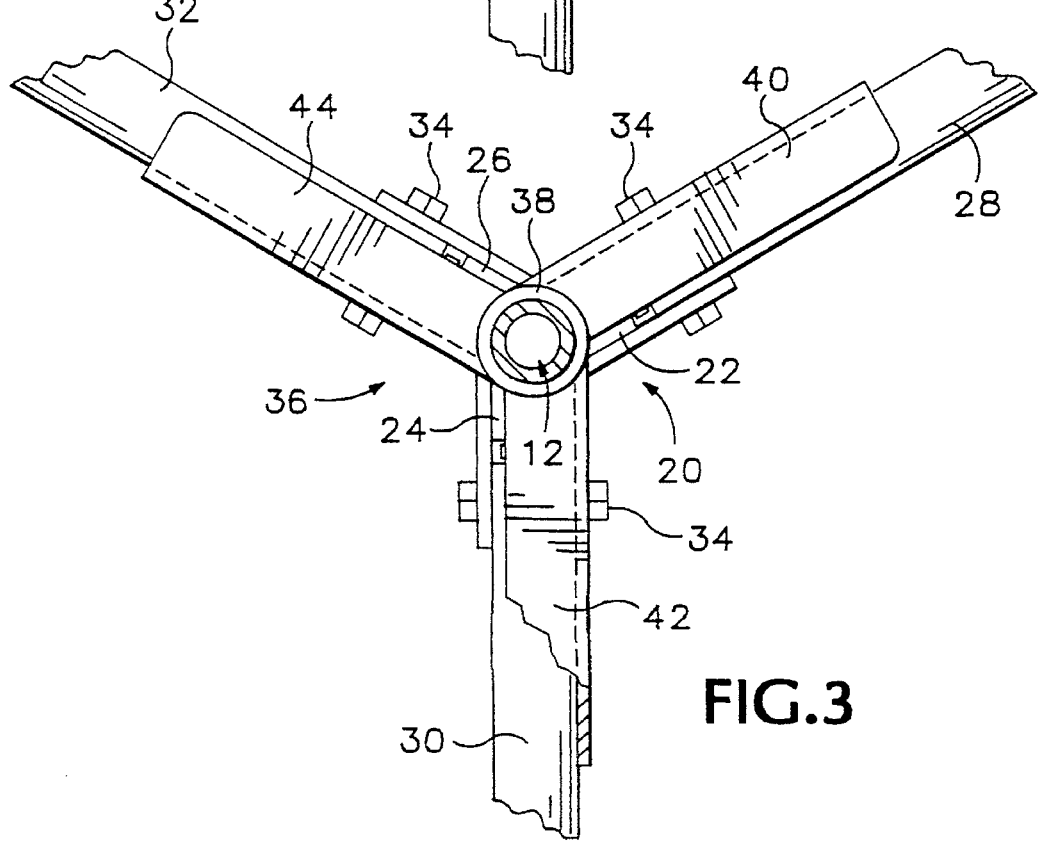
FIG. 3 is a sectional, top plan view of a spider structure of the invention, depicting the legs of the stand in a extended position, taken generally along line 3—3 of FIG. 2.

Leg assembly 14 also includes a spider structure, which is depicted generally at 36. Spider structure 36 is provided to maintain legs 28, 30 and 32 in their extended position. The spider structure includes a spider-structure body 38, which is rotatably received on column 12, and spider-structure arms 40, 42 and 44, which are secured to spider-structure body 38, as by welding in the preferred embodiment, and which extend outwardly from the spider-structure body for contact with the legs of the stand when the legs are in their extended position. Such a condition is depicted in FIG. 3, wherein the spider-structure arms are in contact with the legs of the stand.

FIG. 4 depicts the spider structure in a rotated condition, as indicated by arrow 46. A leg-engaging mechanism is provided on at least one of the spider-structure arms for engaging a leg. In the embodiment depicted, such leg-engaging mechanism takes the form of a downwardly protruding portion of each spider-structure arm, depicted at 40a, 42a and 44a. The leg-engaging mechanism is constructed and arranged to prevent rotation of the spider body relative to the legs in a first direction, which is indicated by arrow 48, while allowing rotation in a second, opposite direction, as indicated by arrow 46. It should be noted that leg-receiving pockets are constructed and arranged to allow the legs to drop through an arc of predetermined magnitude, so that the legs will be in their extended position and will allow passage of spider-structure arms thereover, yet will not allow the legs to drop so far that the leg-engaging mechanism will miss the legs when the legs are in their extended position. This feature is achieved by adjusting the length of the bottom portion of the leg-receiving pocket and the location of the bore for fasteners 34 relative to the tree end of the leg-receiving pocket.

Referring momentarily to FIG. 5, it should be noted that spider-structure body 38 and spider-structure arms 40, 42 and 44 are constructed and arranged so that, when legs 28, 30 and 32 are in their folded position, the stand is supported on arms 40, 42 and 44, to prevent the stand from tipping over.

Returning now to FIGS. 1 and 2, spider-structure body 38 is held in a desired vertical position on column 12 by a retention mechanism 50. Retention mechanism 50, in the preferred embodiment, includes an upper spider-structure-body stop 52, and a lower spider-structure-body stop 54. In the preferred embodiment, the upper and lower spider-structure-body stops are affixed to column 12, above and below, respectively, spider-structure body 38 in a manner that allows tree rotation of spider-structure body 38, but retains the spider-structure body 38 in a vertical position relative to column 12.

Column 12 has a column plug 56 located at the upper end thereof. Plug 56 extends vertically downward along a portion of the column to strengthen the upper end of the column and to minimize damage to the column in the event of impact by a projectile.

Column 12 also includes a pair of column bores 58, 60 located adjacent the upper end thereof, which bores extend through column 12 and also through plug 56.

Target holder 16 now will be described in greater detail. Target holder 16 includes a target frame 62, which, in the preferred embodiment, is a rectangular frame, formed of solid cold-rolled steel, having a circular cross section. Frame 62 may also be formed of metal having an air-foil or tear-drop cross section if desired. Such alternate cross sections may serve to deflect projectiles, thereby lessening their impact on the stand. Frame 62 includes an upper frame portion 64, lower frame portion 66, and side portions 68 and 70.

Holder 16 also includes target fasteners 72, 74 for holding a target to the frame. A collapsing mechanism, depicted generally at 76 is provided and allows the target holder to be collapsed relative to column 12. Part of the collapsing mechanism is the connection between target holder 16 in column 12. Lower frame portion 66 extends through column 12, and specifically through upper column bore 58. A lock plate 78 is also secured to lower frame portion 66 and includes a lock plate bore 80 therein. A frame stop 81 is provided to prevent lateral shifting of lower frame portion 66 in bore 58. A pin 82 is provided and, when inserted through lock plate bore 80 and lower column bore 60, is operable to fix the target holder in its upright condition. Pin 82 includes a bale 84, which is mounted on the head of pin 82 and which is constructed and arranged to encompass the other end of pin 82, thereby maintaining the pin in a secured position within the lock plate bore and column lower bore 60 and further to be shiftable so that it does not encompass the other end of pin 82, thereby allowing pin 82 to be removed from the stand.

As may be seen in FIG. 1, target holder 16 is rotatable relative to column 12 about an axis 86, which axis extends normal to column 12, and is coincident with the axis of lower frame portion 66. Frame 62 is rotatable between an upright position, as depicted in FIGS. 1 and 2, and a collapsed position, as depicted in FIG. 5.

An elongate lock arm 88 is fixed at one end thereof to frame 62 and extends outwardly therefrom. In the preferred embodiment, lock arm 88 is fixed to upper frame portion 64. A lock arm bore 90 is located adjacent the other end of lock arm 88. Frame 62 and lock arm 88 form part of what is referred to here as a leg-locking mechanism, which is operable to hold the legs in their folded position. Pin 82 also forms part of the leg-locking mechanism.

In order to collapse stand 10, bale 84 is disengaged from the other end of pin 82 and the pin is removed from lock plate bore 80 and column lower bore 60. This allows target holder 16 to rotate to its collapsed position. Before moving target holder 16 to its fully collapsed condition, however, the stand may be lifted and spider-structure body 38 rotated to the position shown in FIG. 4, which allows the legs to be rotated to their folded position. Once the legs have been rotated to their folded position, target holder 16 is allowed to drop, whereupon it will contact, in the preferred embodiment, two of the legs, preventing the legs from dropping to their extended position. Lock arm 88 is positioned on upper frame portion 64 such that it clears column 12 and extends toward the one remaining leg. Pin 82 is positioned through lock arm bore 90, and bale 84 is secured to the other end of pin 82 about the remaining leg(s), thereby retaining the remaining leg in position, and securing the stand into a fully-collapsed position.

In order to extend the frame to its extended condition, pin 82 is removed from bore 90, target holder 16 is rotated to its upright position, the legs are allowed to drop to their extended position, spider-structure body 38 is rotated in its first direction so that the spider-structure arms contact the legs, and pin 82 is inserted into lock plate bore 80 and column lower bore 60. A target may then be inserted into target fastener 72, 74, and the stand is ready for use.

One of the features of the construction of stand 10 is that the individual pieces of the stand are allowed to move relative one another when the stand is in its extended condition, thereby allowing the stand to flex. This provides several important advantages. One advantage is that if the stand is struck by a projectile, it will flex, rather than being seriously damaged. Another advantage is that if the stand is struck by a projectile, the flexing ability of the stand will prevent the stand from being knocked over. The flexible construction of stand 10 is accomplished by a number of assembly features. One feature is the use of an over-sized column bore 58 relative to lower frame portion 66. The arrangement of lock plate 78 and pin 82 with lower column bore 60 allows flexing of target holder 16 relative to column 12. Spider structure 36 as used to contact the legs allows flexing of the legs relative to column 12 when the legs are in their extended position.

Although a preferred embodiment of the invention has been disclosed herein, it should be appreciated that variations and modifications may be made thereto without departing from the scope of the invention, as defined in the appended claims.

I claim:

1. A stand comprising:

a vertically disposed, elongate column;

a leg assembly, including:
   a leg attachment assembly located adjacent a lower end of said column, having multiple leg-receiving pockets therein; and
   plural legs, each received in a leg-receiving pocket, said legs being shiftable from a folded position, wherein each leg is aligned substantially parallel to said column, to an extended position; and a spider structure for maintaining said legs in said extended position, including:
   a spider-structure body which is rotatably received on said column and which is rotatable relative to said legs between an aligned condition and a mis-aligned condition, and, which, when rotated to said mis-aligned condition, allows said legs to be shifted to their folded position; and
   spider-structure arms which are fixedly secured to said spider-structure body and which extend outwardly therefrom for contact with said legs when said legs are in said extended position.

2. The stand of claim 1 wherein said spider structure further includes a spider-structure-body retention mechanism for holding said spider-structure body in a vertical position relative to said column, said spider-structure-body retention mechanism including an upper spider-structure-body stop and a lower spider-structure-body stop.

3. The stand of claim 1 wherein said spider-structure arms include a leg-engaging mechanism on at least one spider-structure arm for engaging a leg, and wherein said leg-engaging mechanism is constructed and arranged to prevent rotation of said spider body relative to said legs.

4. The stand of claim 1 which further includes a target holder mounted at the upper end of said column for holding a target thereon, said target holder including a frame, a fastener for holding a target to said frame, and a target holder collapsing mechanism for collapsing said target holder relative to said column.

5. The stand of claim 4 wherein said target holder is rotatable relative to said column, wherein said column upper end includes at least two column bores therethrough, and wherein a portion of said frame is rotatably received in one of said bores for rotation relative to said column between an upright condition and a collapsed condition, said target holder further including a lock plate which is fixed to said frame and which includes a lock-plate bore therethrough, and wherein the stand further includes a pin which is receivable in said lock-plate bore and in said other column bore for fixing said target holder in said upright condition.

6. The stand of claim 5 wherein said target holder is constructed and arranged to hold at least some of said legs in said folded position with said legs in said folded position and said target holder collapsed downwards along said column; wherein said target holder includes an elongate lock arm fixed at one end thereof to said frame and extending outwardly therefrom, said lock arm having a bore adjacent the other end thereof, wherein said pin includes a ball thereon, and with said pin inserted in said lock arm bore, said bail receives the remaining legs therein to hold said remaining legs is their folded position and to hold said target holder in said collapsed condition.

7. The stand of claim 1 wherein said upper end of said column includes a column plug to strengthen said other end of said column, wherein said plug extends vertically downward along a portion of said column.

8. A stand comprising:

a vertically disposed, elongate column;

a leg assembly, including:
   a leg attachment assembly located adjacent a lower end of said column, having multiple leg-receiving pockets therein; and
   plural legs, each received in a leg-receiving pocket, each leg being rotatable through an arc within said pocket, said legs being shiftable from a folded position, wherein each leg is aligned substantially parallel to said column, to an extended position, wherein each leg is shifted through an arc to a position at least normal to said column;

a leg-locking mechanism for holding said legs in said folded position; and a spider structure for maintaining said legs in said extended position, including:
   a spider-structure body which is rotatably received on said column;
   spider-structure arms which are fixed relative to said spider-structure body and which extend outwardly therefrom for contact with said legs when said legs are in said extended position, wherein said spider-structure arms include a leg-engaging mechanism on at least one spider-structure arm for engaging a leg, and wherein said leg-engaging mechanism is constructed and arranged to prevent rotation of said spider body relative to said legs in a first direction while allowing rotation in a second, opposite direction for disengaging a leg, thereby allowing said legs to be shifted to said folded position.

9. The stand of claim 8 wherein said spider structure further includes a spider-structure-body retention mechanism for holding said spider body in a vertical position relative to said column, said spider-structure-body retention mechanism including an upper spider-structure-body stop and a lower spider-structure-body stop, wherein said upper and lower spider-structure-body stops are fixed to said column above and below, respectively, said spider-structure body.

10. The stand of claim 8 which further includes a target holder mounted at the upper end of said column for holding a target thereon, said target holder including a frame, a fastener for holding a target to said frame, and a target holder collapsing mechanism for collapsing said target holder relative to said column.

11. The stand of claim 10 wherein said target holder is rotatable relative to said column about an axis extending normal to said column, wherein said column upper end includes at least two column bores therethrough, and wherein a portion of said frame is rotatably received in one of said bores for rotation relative to said column between an upright condition and a collapsed condition, said target holder further including a lock plate which is fixed to said frame and which includes a lock-plate bore therethrough, and wherein the stand further includes a pin which is receivable in said lock-plate bore and in said other column bore for fixing said target holder in said upright condition.

12. The stand of claim 11 wherein said target holder is constructed and arranged to hold at least some of said legs in said folded position with said legs in said folded position and said target holder collapsed downwards along said column; wherein said target holder includes an elongate lock arm fixed at one end thereof to said frame and extending outwardly therefrom, said lock arm having a bore adjacent the other end thereof, wherein said pin includes a bail thereon, and with said pin inserted in said lock arm bore, said bail receives the remaining legs therein to hold said remaining legs is their folded position and to hold said target holder in said collapsed condition.

13. The stand of claim 8 wherein said stand components are constructed and arranged to flex relative to one another to prevent damage to the stand should the stand be struck by a projectile.

14. A stand comprising:

a vertically disposed, elongate column; and a leg assembly, including:

a leg attachment assembly located adjacent a lower end of said column, having multiple leg-receiving pockets therein;

plural legs, each received in a leg-receiving pocket, said legs being shiftable from a folded position, wherein each leg is aligned substantially parallel to said column, to an extended position;

a spider structure for maintaining said legs in said extended position, including:

a spider-structure body which is rotatably received on said column;

spider-structure arms which are secured to said spider-structure body and which extend outwardly therefrom for contact with said legs when said legs are in said extended position, wherein said spider-structure arms inclue a leg-engaging mechanism on at least one spider-structure arm for engaging a leg, and wherein said leg-engaging mechanism is constructed and arranged to prevent rotation of said spider body relative to said legs in a first direction while allowing rotation in a second, opposite direction for disengaging a leg, thereby allowing said legs to be shifted to said folded position; and a target holder mounted at the upper end of said column for holding a target thereon, said target holder including a frame, a fastener for holding a target to said frame, and a target holder collapsing mechanism for collapsing said target holder relative to said column.

15. The stand of claim 14 wherein said spider structure further includes a spider-structure-body retention mechanism for holding said spider body in a vertical position relative to said column, said spider-structure-body retention mechanism including an upper spider-structure-body stop and a lower spider-structure-body stop.

16. The stand of claim 15 wherein said target holder is rotatable relative to said column about an axis extending normal to said column, wherein said column upper end includes at least two column bores therethrough, and wherein a portion of said frame is rotatably received in one of said bores for rotation relative to said column between an upright condition and a collapsed condition, said target holder further including a lock plate which is fixed to said frame and which includes a lock-plate bore therethrough, and wherein the stand further includes a pin which is receivable in said lock-plate bore and in said other column bore for fixing said target holder in said upright condition.

17. The stand of claim 16 wherein said target holder is constructed and arranged to hold at least some of said legs in said folded position with said legs in said folded position and said target holder collapsed downwards along said column; wherein said target holder includes an elongate lock arm fixed at one end thereof to said frame and extending outwardly therefrom, said lock arm having a bore adjacent the other end thereof, wherein said pin includes a bail thereon, and with said pin inserted in said lock arm bore, said bail receives the remaining legs therein to hold said remaining legs is their folded position and to hold said target holder in said collapsed condition.

18. The stand of claim 15 wherein said upper end of said column includes a column plug to strengthen said other end of said column, wherein said plug extends vertically downward along a portion of said column, and wherein said column bores extend through said plug.

* * * * *